United States Patent
Szor et al.

(10) Patent No.: US 7,665,139 B1
(45) Date of Patent: Feb. 16, 2010

(54) METHOD AND APPARATUS TO DETECT AND PREVENT MALICIOUS CHANGES TO TOKENS

(75) Inventors: Peter Szor, Northridge, CA (US); Peter Ferrie, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 832 days.

(21) Appl. No.: 11/303,804

(22) Filed: Dec. 16, 2005

(51) Int. Cl.
*G06F 12/14* (2006.01)
*G06F 11/00* (2006.01)

(52) U.S. Cl. .............................. 726/24; 726/22; 726/23; 726/25; 726/26; 726/30; 713/100; 713/188

(58) Field of Classification Search ................... 726/24
See application file for complete search history.

(56) References Cited

U.S. PATENT DOCUMENTS 7,191,469 B2 * 3/2007 Erlingsson .................. 726/27

OTHER PUBLICATIONS

Keong, T.C., 'Defeating Kernel Native API Hookers by Direct Service Dispatch Table Restoration', Special Interest Group in Security and Information Integrity (SIGA2), Oct. 3, 2004, entire document, http://www.security.org.sg/code/SIG2_DefeatingNativeAPIHookers.pdf.*
Battistoni, R., et al, 'An Extended Access Control System For Windows XP', Sourceforge.net, Nov. 2003, entire document, http://whips.sourceforge.net/res/WHIPSarticle.pdf.*
Butler, James, VICE—Catch the hookers! Black Hat, Las Vegas, Jul. 2004. www.blackhat.com/presentations/bh-usa-04/bh-us-04-butler/bh-us-04-butler.pdf.*
Szor, P., "The Art of Computer Virus Research and Defense", 2005, Addison-Wesley, pp. 247-249.

* cited by examiner

*Primary Examiner*—Kambiz Zand
*Assistant Examiner*—Ronald Baum
(74) *Attorney, Agent, or Firm*—Gunnison, McKay & Hodgson, L.L.P.; Forrest Gunnison

(57) ABSTRACT

Accesses to critical tokens are monitored and malicious changes to the security privileges of those critical tokens are detected and prevented.

20 Claims, 4 Drawing Sheets

METHOD AND APPARATUS TO DETECT AND PREVENT MALICIOUS CHANGES TO TOKENS

BACKGROUND OF THE INVENTION

1. Field of the Invention

The present invention relates to the protection of computer systems. More particularly, the present invention relates to detection and prevention of malicious changes to tokens, such as access tokens.

2. Description of Related Art

Spyware is typically a software application that covertly gathers information about a user's computer related activity and transmits that information to a third party. Spyware is typically bundled with another program, such as a freeware or a shareware program, and installed on a user's computer system without the user's knowledge or permission. As spyware operates covertly, it is generally viewed as malicious code.

Similar to spyware, adware is typically a software application bundled with another software program and loaded onto a user's computer. Adware typically generates advertising, such as pop-ups and banners, while the other software program is running. While adware is generally identified in an agreement provided to the user and is noticeable due to the advertising presence, some adware also gathers information about the user's computer related activity and provides the information to a third party, and thus in some instances is spyware disguised as adware.

As both spyware and adware are generally unwanted and often invade a user's privacy, user's are increasingly using computer security software, sometimes called anti-spyware or anti-adware software, to detect and remove the spyware and adware applications from the computer system. Recently, however, some spyware and adware programs have begun to implement malicious code like features to protect themselves from computer security applications that detect and attempt to remove them.

SUMMARY OF THE INVENTION

Embodiments in accordance with the invention monitor the access to selected tokens and prevent the security related privileges of those tokens, such as access privileges, from being removed or set in ways that are indicative of malicious code.

According to one embodiment of the invention, a method includes stalling a call to a set token function, the call to the set token function including a token handle, which identifies an access token, and a current privilege list. A determination is made whether the token handle corresponds to an identifier of a reference copy of an initial privilege list associated with the access token.

Upon a determination that the token handle corresponds to an identifier of a reference copy associated with the access token, the current privilege list is compared to the initial privilege list to identify any changes in the current privilege list from the initial privilege list. The changes, if any, are evaluated to determine whether the changes are malicious changes. When malicious changes are indicated, protective action is taken, such as failing the call. In some embodiments, a notification is provided to the user. Alternatively, when malicious changes are not indicated, the call is released.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
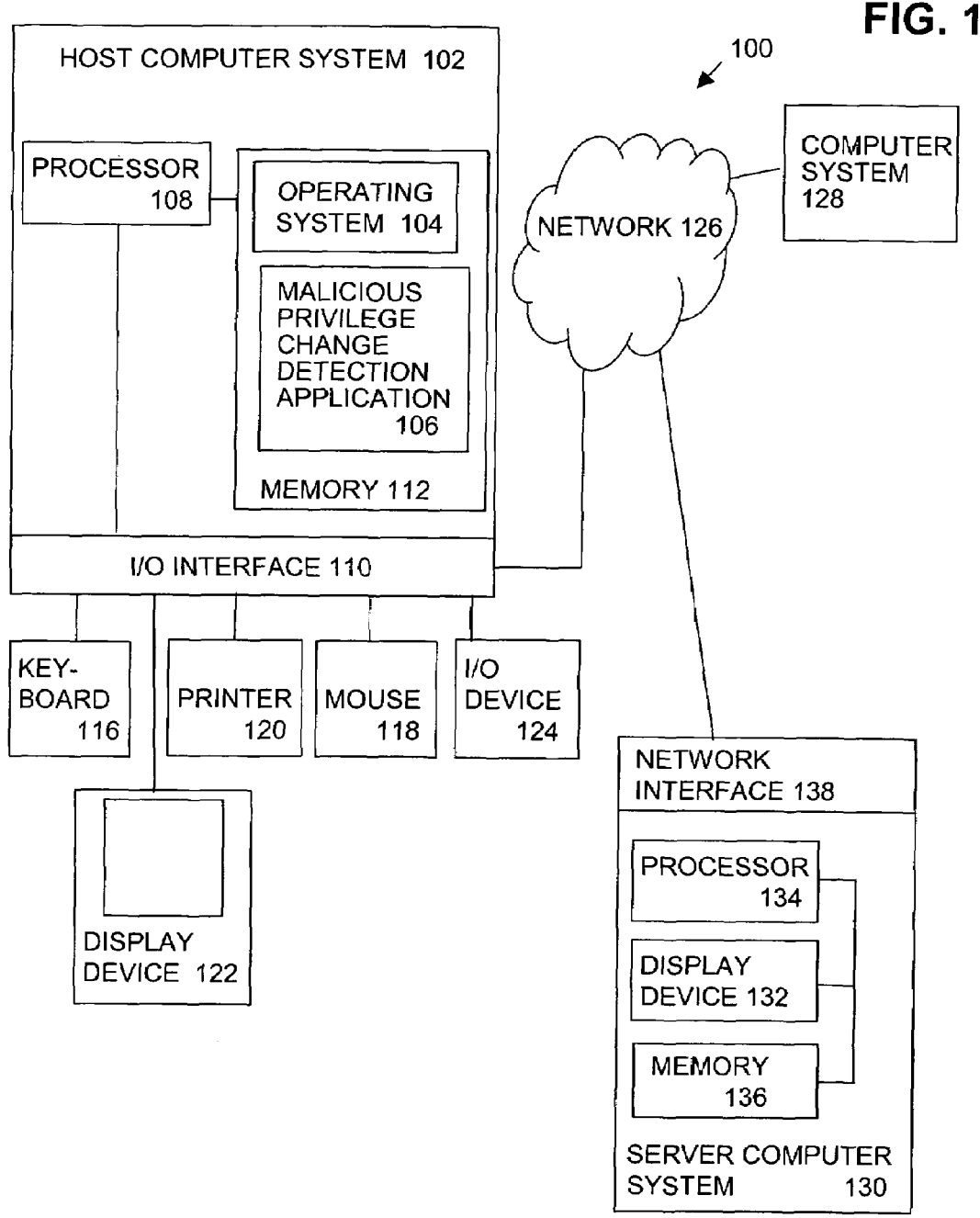
FIG. 1 is a diagram of a client-server system that includes a malicious privilege change detection application executing on a host computer system in accordance with one embodiment of the present invention.

Many computer security applications require selected security-related privileges on a computer system to successfully implement remediation actions when malicious code is detected on a computer system. For example, the debug privilege is required by some computer security applications to implement memory scanning and repair. In particular, many computer security applications, such as anti-spyware and anti-adware security applications, require the debug privilege to detect and remove or disable spyware and adware applications on a computer system. Generally the debug privilege grants read or open access to an object and allows an object, such as a user, process or thread, the ability to open and alter a process while it is executing.

Recently, some adware and spyware programs have begun to implement retrovirus-like features to protect themselves from computer security applications that detect and remediate them. Generally a retrovirus is a computer virus that attempts to bypass or hinder the operations of computer security program. One of the generic retrovirus features of recent adware programs, such as Adware.Look2me, is to remove the debug privilege from all accounts that had the debug privilege previously, and to periodically adjust the associated security related tokens to prevent the debug privilege from being granted dynamically.

Unfortunately, several computer security applications such as antivirus, and adware/spyware removal tools, and even anti-rootkit solutions often refuse to run, when a required privilege, such as the debug privilege, is not available. This allows attackers to implement a general retrovirus technique against computer security applications without requiring program names.

Embodiments in accordance with the invention monitor access to the access tokens of selected users, processes and threads to prevent the privileges of the access token from being removed or altered in a way that disables or otherwise negatively impacts the privileges of the user, process or thread.

The following embodiments in accordance with the invention are described with reference to a Windows operating system, such as Windows 2000/NT, however those of skill in the art can recognize that the present invention is applicable to other operating systems as well.

Herein a call includes code used to invoke a function. A call to a function specifies the function to invoke, and optionally includes parameters associated with the call.

Herein, in one embodiment, malicious code is defined as any computer program, module, set of modules, or code that enters a computer system environment without an authorized user's knowledge and/or without an authorized user's consent. In one embodiment, adware and spyware applications are examples of malicious code.

Embodiments in accordance with the present invention detect and prevent adware, spyware and other malicious programs from manipulating the privileges of key applications or user accounts. By monitoring access to access tokens, unknown adware, spyware and other malicious programs are automatically detected allowing protective action to be taken. Additionally manipulations of access rights to user accounts, such as Local System or Administrator, can be prevented allowing security software access rights to remain adjustable. Further embodiments in accordance with the present invention permit new security risks and malicious programs to be collected from the field.

Referring generally to FIG. 2, according to one embodiment of the present invention, a method includes hooking one or more open token functions (operation 204) and one or more set token functions (operation 206) on a computer system. When a call to an open token function is received (operations 208, 210 and 212), the call is stalled (operation 216). The open token function is called (operation 218) and in response a token handle is received (operation 220).

A determination is made whether the token handle, and thus the call to the open token function, identifies a critical token (operation 222). If the call to the open token function does not identify a critical token, the call to the open token function is completed, e.g., the caller is returned to (operation 230). Alternatively, if the call to the open token function identifies a critical token, a determination is made whether a reference copy of the initial privilege list of the critical token has been generated (operation 224).

If a reference copy of the critical token has been generated, the call to the open token function is completed (operation 230). Alternatively, if a reference copy of the critical token has not been generated, the initial privilege list is obtained (operation 226). A reference copy of the initial privilege list is generated (operation 228) and the call is completed, e.g., the caller is returned to (operation 230). In one embodiment, the reference copy includes a copy of the initial privilege list and is associated with the token handle, which is used as the identifier of the reference copy and saved as an entry in a memory structure, such as a reference copy database.

Different from a call to an open token function, when a call to a set token function is received (operations 208, 210 and 214), in one embodiment, the method further includes stalling the call to the set token function (operation 234) and determining whether the call to the set token function identifies an access token having a saved reference copy (operation 236). If the call to the set token function does not identify an access token having a saved reference copy, the call is released and allowed to complete (operation 242). Alternatively, if the call to the set token function identifies an access token having a saved reference copy, the current privilege list identified in the call to the set token function is compared to the initial privilege list in the reference copy (operation 238) to identify any changes in the current privilege list from the initial privilege list.

The changes, if any, are evaluated and a determination is made whether the changes in the current privilege list are malicious changes, i.e., indicative of malicious code (operation 240). If the changes are not determined to be malicious changes, the call to the set token function is released and allowed to complete (operation 242). Alternatively, if the changes are determined to be malicious changes, protective action is taken (operation 244), such as failing the call to the set token function. Optionally, a user and/or system administrator is notified (operation 246).

Referring now to FIG. 1, FIG. 1 is a diagram of a client-server system 100 that includes a malicious privilege change detection application 106 executing on a host computer system 102, e.g., a first computer system, in accordance with one embodiment of the present invention. Host computer system 102, sometimes called a client or user device, typically includes a central processing unit (CPU) 108, hereinafter processor 108, an input/output (I/O) interface 110, and a memory 112. In one embodiment, memory 112 includes an operating system 104 such as a page-based virtual memory system that uses pages, e.g., memory areas.

For example, Windows 2000 and Windows NT are 32-bit operating systems widely used on home and business computer systems. Windows 2000 and Windows NT provide page-based virtual memory management schemes that permit programs to realize a 4 GB (gigabyte) virtual memory address space. In one embodiment, when processor 108 is running in virtual memory mode, all addresses are presumed virtual addresses and are translated, or mapped, to physical addresses each time processor 108 executes a new instruction to access memory.

Conventionally, the 4 GB virtual memory address space is divided into two parts: a lower 2 GB user address space, also referred to as user mode address space, or ring 3, available for use by a program; and, a high 2 GB system address space, also referred to as kernel address space, or ring 0, reserved for use by the operating system.

To protect the integrity of the operating system code, and other kernel address space code and data structures from errant or malicious programs, and to provide efficient system security (user rights management), Windows 2000 and Windows NT separate code executing in the user address space, e.g., user mode, from code executing in the kernel address space, e.g., kernel mode. User mode code typically does not have direct access to kernel mode code and has restricted access to computer system resources and hardware. To utilize kernel mode code functionalities user mode programs utilize system calls, sometimes called operating system (OS) function calls, which interface between the user mode and kernel mode functions.

Windows operating systems, such as Windows 2000 and Windows NT, represent various resources as objects to control and protect the operating system and the resources that run on the computer system. Some examples of objects include users, processes, and threads. To control who can manipulate an object, Windows controls the access to the object.

Windows operating systems use an object termed an access token, or simply a token, to identify the security profile, such as the security identifier (SID) and privileges, of a user, a process or a thread. An access token generally includes two components, the security identifier (SID) component and a privilege array, also termed herein a privilege list.

The privilege array is a list of privileges associated with the token. A privilege has two states: enabled or disabled. Examples of some common privileges include the backup privilege, the debug privilege, and the shutdown privilege. In particular the debug privilege, e.g., SeDebug, is required to debug a process.

Windows maintains the access token assigned to a user, process or thread in a protected region of the operating system termed the registry. The registry is a database that stores configuration information for the operating system and the applications that run on it. Information in the registry is stored in and accessed through an associated key. The Windows registry and registry keys are well known to those of skill in the art and are not further described herein to avoid detracting from the principles of the invention.

When a user, process or thread attempts to perform an operation, such as perform a debug operation, the operating system would reference the privilege list of the associated access token in the registry to determine whether the user, process or thread has the required privilege to perform the operation. If malicious code disables a privilege in the registry required by a user, process or thread to perform an operation, the user, process or thread would not be able to perform the operation. For example, if a spyware or adware application disables the debug privilege in an access token associated with a computer security application in the registry so that the computer security application can no longer scan the memory of running processes, the computer security application is essentially disabled by the spyware/adware application.

Host computer system 102 may further include standard devices like a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, malicious privilege change detection application 106 is loaded into host computer system 102 via I/O device 124, such as from a CD, DVD or floppy disk containing malicious privilege change detection application 106.

Host computer system 102 is coupled to a server system 130 of client-server system 100 by a network 126. Server system 130 typically includes a display device 132, a processor 134, a memory 136, and a network interface 138.

Further, host computer system 102 is also coupled to a computer system 128, such as an attacker computer system, by network 126 over which information can be sent from malicious code, such as a spyware or an adware program, installed on host computer system 102. In one embodiment, computer system 128 is similar to host computer system 102 and, for example, includes a central processing unit, an input output (I/O) interface, and a memory. Computer system 128 may further include standard devices like a keyboard, a mouse, a printer, a display device and an I/O device(s). The various hardware components of computer system 128 are not illustrated to avoid detracting from the principals of the invention.

Network 126 can be any network or network system that is of interest to a user. In various embodiments, network interface 138 and I/O interface 110 include analog modems, digital modems, or a network interface card.

In one embodiment of the invention, malicious privilege change detection application 106 is stored in memory 112 of host computer system 102 and executed on host computer system 102. The particular type and configuration of host computer system 102, computer system 128, and server system 130 are not essential to the present invention.

Figure 2A:
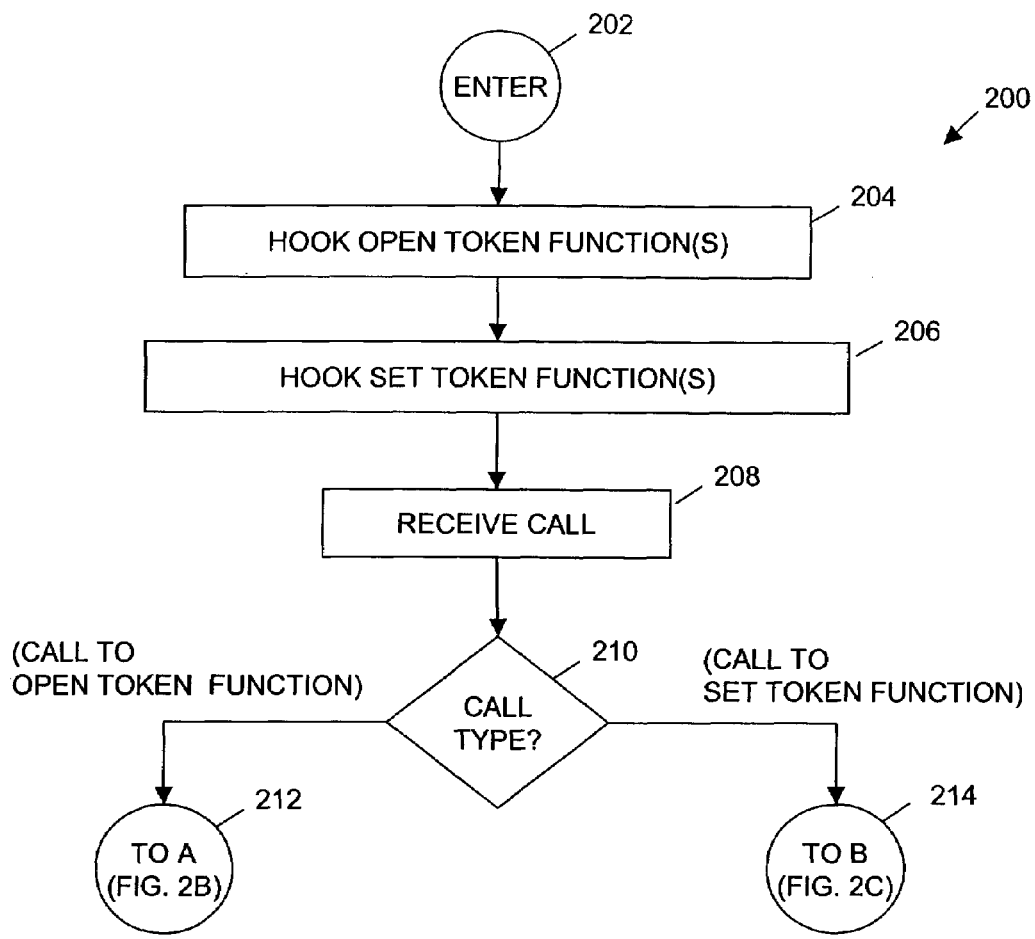
FIG. 2 is a key to FIGS. 2A, 2B and 2C which illustrate a flow diagram of a method for detecting and preventing malicious changes to a token in accordance with one embodiment of the present invention.
Figure 2B:
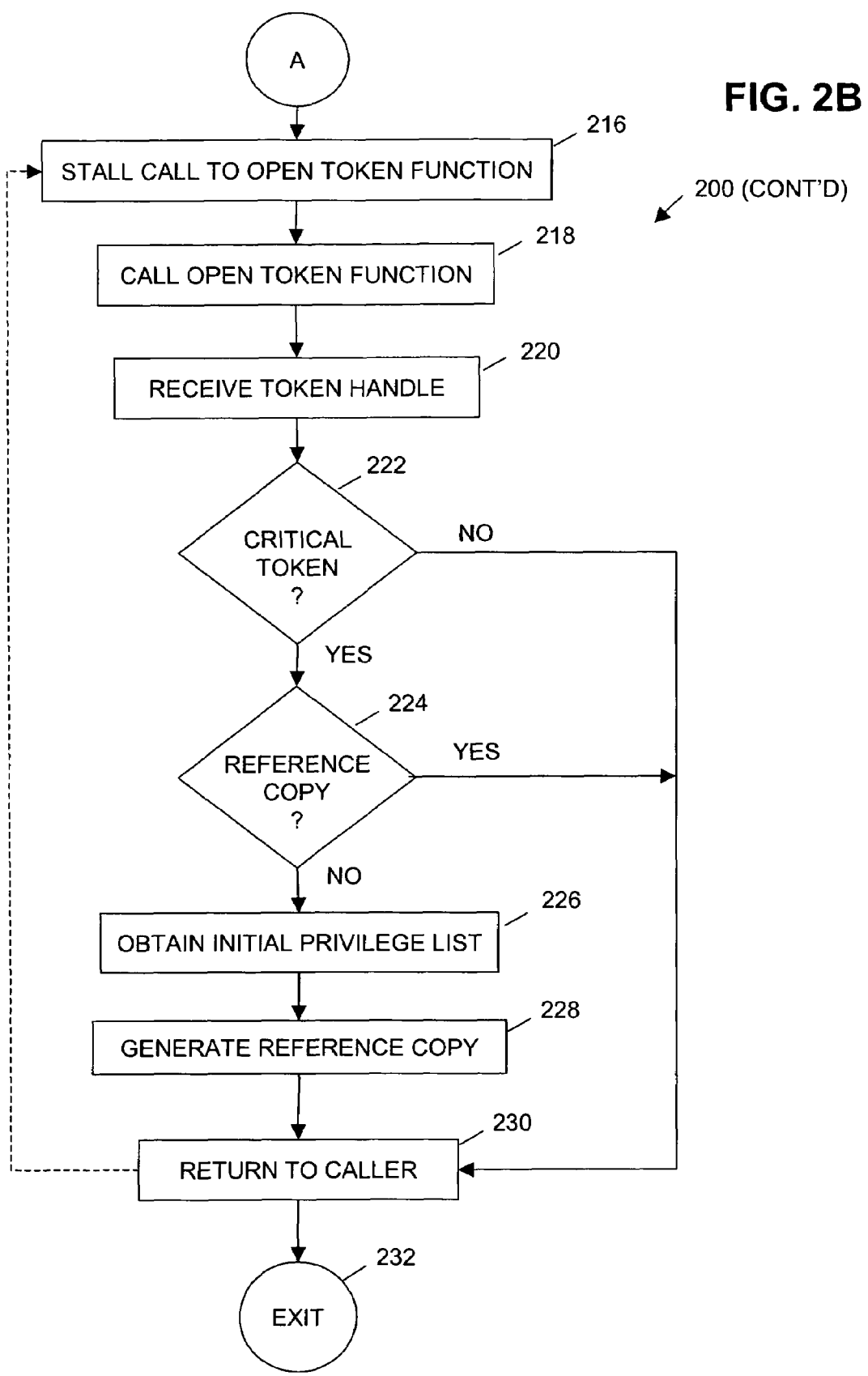
Figure 2C:
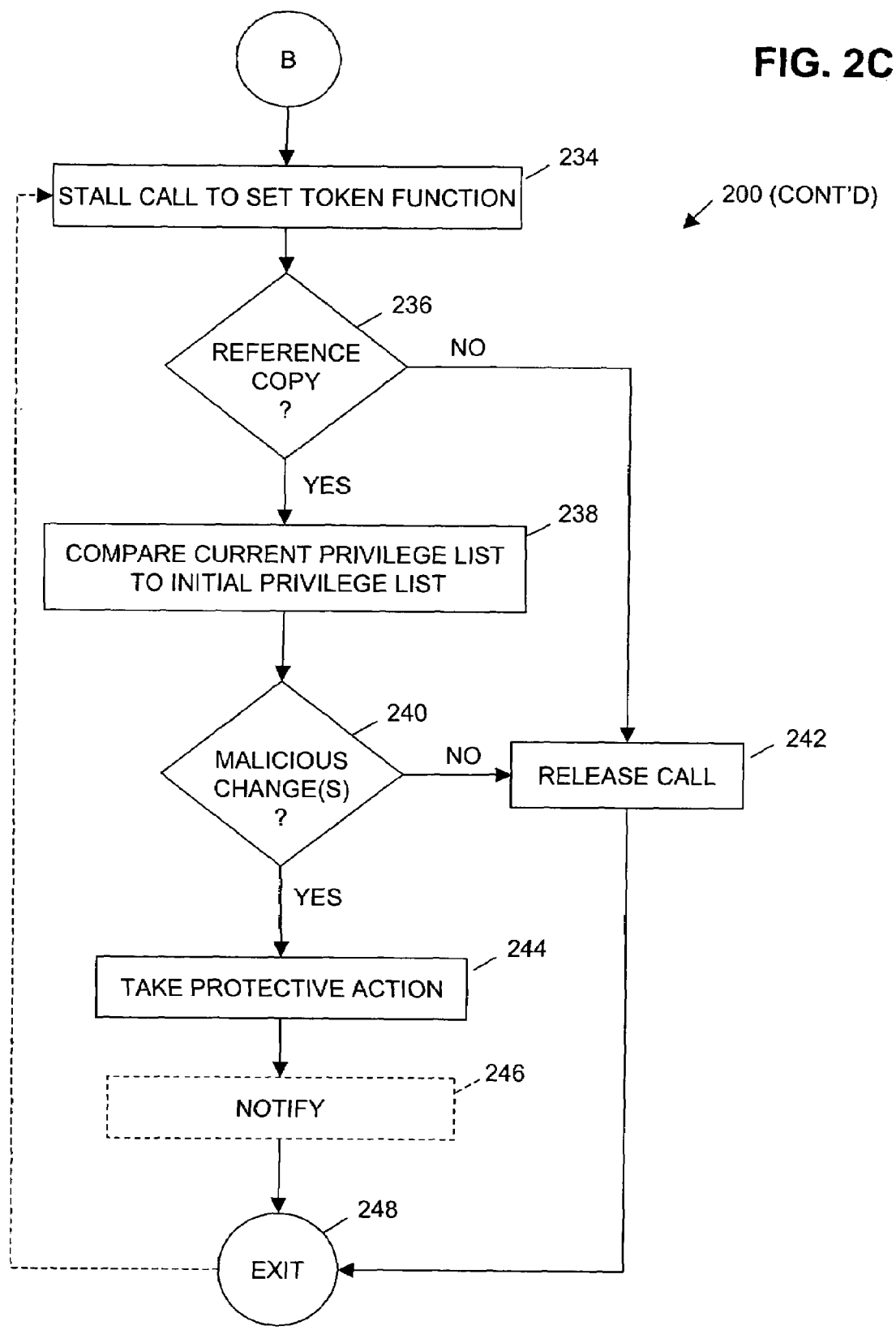

FIG. 2 is a key to FIGS. 2A, 2B and 2C which illustrate a flow diagram of a method 200 for detecting and preventing malicious changes to a token in accordance with one embodiment of the present invention. Referring now to FIGS. 1 and 2 together, in one embodiment of the invention, execution of malicious privilege change detection application 106 by processor 108 results in the operations of method 200 as described below.

In the present embodiment, malicious privilege change detection application 106 is installed on host computer system as a kernel mode driver. In one embodiment, method 200 is entered at an ENTER operation 202, and from ENTER operation 202, processing transitions to a HOOK OPEN TOKEN FUNCTION(S) operation 204.

In HOOK OPEN TOKEN FUNCTION(S) operation 204, one or more open token functions are hooked on host computer system 102. Herein, in one embodiment, an open token function is an operating system function that opens a token in the registry of a computer system, e.g., host computer system 102.

For example, in one embodiment, an open token function includes the operating system function callable utilizing the ZwOpenKey( ) API, and herein termed the ZwOpenKey( ) function. Hooking of open token functions can be performed utilizing a variety of hooking techniques.

For example, in one embodiment, a service descriptor table entry associated with the ZwOpenKey( ) API in a service descriptor table, e.g., the NTOS API service descriptor table, is modified so that a call to the associated operating system function, e.g., the ZwOpenKey( ) function is redirected to alternate code, such as a hook module of malicious privilege change detection application 106. In one embodiment, a function pointer in the service descriptor table entry is modified to point to the hook module rather than the ZwOpenKey( ) function in the operating system. From HOOK OPEN TOKEN FUNCTION(S) operation 204, processing transitions to a HOOK SET TOKEN FUNCTION(S) operation 206.

In HOOK SET TOKEN FUNCTION(S) operation 206, one or more set token functions are hooked on host computer system 102. Herein, in one embodiment, a set token function is an operating system function that modifies one or more settings in a specified token in the registry in accordance with one or more values provided in the call to the set token function. In particular, a set token function is an operating system function that modifies a privilege array of a token in a registry.

For example, in one embodiment, a set token function includes the operating system function callable utilizing the ZwSetValue( ) API, and herein termed the ZwSetValue( ) function. Hooking of set token functions can be performed utilizing a variety of hooking techniques.

For example, in one embodiment, a service descriptor table entry associated with the ZwSetValue( ) API in a service descriptor table, e.g., the NTOS API service descriptor table, is modified so that a call to the associated operating system function, e.g., ZwSetValue( ) function, is redirected to alternate code, such as a hook module of malicious privilege change detection application 106. In one embodiment, a function pointer in the service descriptor table entry is modified to point to the hook module rather than the ZwSetValue( ) function in the operating system. From HOOK SET TOKEN FUNCTION(S) operation 206, processing transitions to a RECEIVE CALL operation 208.

In RECEIVE CALL operation 208, a call to a hooked open token function or a hooked set token function is received by malicious privilege change detection application 106. From RECEIVE CALL operation 208, processing transitions to a CALL TYPE check operation 210.

In CALL TYPE check operation 210, a determination is made whether the call received in operation 208 is a call to an open token function or a call to a set token function. In the present embodiment, CALL TYPE check operation 210 is included to provide a clearer description of one embodiment of the present invention. It can be understood by those of skill in the art that the functions of operation 210 can be variously implemented, such as by an event handler or other process for routing calls received by malicious privilege change detection application 106.

When the call is a call to an open token function, processing transitions from CALL TYPE check operation 210, at operation 212, to a STALL CALL TO OPEN TOKEN FUNCTION operation 216 (FIG. 2B). Alternatively when the call is a call to a set token function, processing transitions from CALL TYPE check operation 210, at operation 214, to a STALL CALL TO SET TOKEN FUNCTION operation 234.

Referring now to FIG. 2B, in STALL CALL TO OPEN TOKEN FUNCTION operation 216, the call to the open token function is stalled. In one embodiment, a call to the ZwOpenKey( ) function is stalled. In one embodiment the call to the open token function includes parameters that identify an access token to be opened in a registry, such as an access token associated with a user, a process or a thread. From STALL CALL TO OPEN TOKEN FUNCTION operation 216, processing transitions to a CALL OPEN TOKEN FUNCTION operation 218.

In CALL OPEN TOKEN FUNCTION operation 218, malicious privilege change detection application 106 calls at the open token function, e.g., initiates the call to the ZwOpenKey( ) function in accordance with the call parameters. From CALL OPEN TOKEN FUNCTION operation 218, process transitions to a RECEIVE TOKEN HANDLE operation 220.

In RECEIVE TOKEN HANDLE operation 220, in response, the operating system returns a token handle for use in accessing the requested access token. In one embodiment, the returned token handle is a pointer to the location of the access token identified in the call to the ZwOpenKey( ) function where the privilege list associated with the token is maintained. The token handle also identifies one or more characteristics that identify the type of access token, for example, user, process or thread access token. From RECEIVE TOKEN HANDLE operation 220, processing transitions to a CRITICAL TOKEN check operation 222.

In CRITICAL TOKEN check operation 222, a determination is made whether the token identified by the token handle is a critical token. In one embodiment, a critical token is defined as an access token that requires protection from privilege changes by malicious code in accordance with an embodiment of the present invention. Examples of critical tokens include tokens associated with Local System or Administrator users as well as tokens associated with processes and threads of computer security applications.

In one embodiment, the token handle and/or the characteristics of the token identified by the token handle returned in operation 220 is compared against a critical token characteristics list included in or accessible by malicious privilege change detection application 106. In one embodiment, entries in the critical token characteristics list include characteristics of users, processes, and/or threads that require protection from privilege changes by malicious code. In one embodiment, the entries in the critical token characteristics list are user-defined. In other embodiments, the entries are defined by default, such as in accordance with a predetermined list provided by a computer security provider. In yet other embodiments, the entries are defined by default and are user extensible.

In the present embodiment, a token handle or one or more characteristics identified in a token handle that corresponds to, e.g., matches, an entry in the critical token characteristics list is defined as identifying a critical token, whereas a token handle or one or more characteristics identified in a token handle that does not correspond to an entry in the critical token characteristics list does not identify a critical token. In one embodiment, when the token handle does not identify a critical token ("NO"), the call is not subject to further evaluation and from CRITICAL TOKEN check operation 222 processing transitions to a RETURN TO CALLER operation 230.

In RETURN TO CALLER operation 230, the call to the open token function is completed. More particularly, information received in response to the call to the open token function by malicious privilege change detection application 106 is returned to the caller. In one embodiment, the token handle received in operation 220 is returned to the caller. From RETURN TO CALLER operation 230, processing transitions to an EXIT operation 232, with processing exiting method 200, or optionally returning to operation 216 on receipt of a next call to an open token function.

Referring again to CRITICAL TOKEN check operation 222, alternatively, when the token handle identifies a critical token ("YES") the call is subject to further evaluation. From CRITICAL TOKEN check operation 222, processing transitions to a REFERENCE COPY check operation 224.

In REFERENCE COPY check operation 224, a determination is made whether a reference copy of the access token associated with the token handle has been generated and saved, such as in a reference copy database. In one embodiment, the token handle received in operation 220 is compared to reference copy identifiers in a reference copy database.

In one embodiment, when the token handle does not correspond to, e.g., does not match, a reference copy identifier in the reference copy database ("NO"), a determination is made that a reference copy of the access token associated with the token handle has not been generated and saved. From REFERENCE COPY check operation 224, processing transitions to an OBTAIN INITIAL PRIVILEGE LIST operation 226.

In OBTAIN INITIAL PRIVILEGE LIST operation 226, the initial privilege list associated with the access token identified in the call is obtained. In one embodiment, the token handle returned in operation 220 is used to query the operating system for the privilege list of the associated access token listed in the registry, for example, using ZwQueryValueKey( ) with the token handle returned in operation 220 as the handle parameter. The operating system locates the privilege list in the registry, i.e., the initial privilege list, and returns the privilege list. From OBTAIN INITIAL PRIVILEGE LIST operation 226, processing transitions to a GENERATE REFERENCE COPY operation 228.

In GENERATE REFERENCE COPY operation 228, a reference copy of the initial privilege list returned in operation 226 is generated. In one embodiment, the reference copy together with an identifier is saved as an entry to a reference copy database. In one embodiment, the associated token handle is the identifier of the reference copy.

In one embodiment, a single reference copy entry is saved for each different token handle. The reference copy provides a copy of the initial privilege list for later comparison with requested changes to the access token. From GENERATE REFERENCE COPY operation 228, processing transitions to RETURN TO CALLER operation 230 earlier described.

Referring again to REFERENCE COPY check operation. 224, alternatively when the token handle corresponds to, e.g., matches, a reference copy identifier in the reference copy database ("YES"), a determination is made that a reference copy of the access token associated with the token handle has been generated and saved. In the present embodiment, as a single reference copy entry is saved for each different token handle, when a reference copy is already present, another reference copy does not need to be generated, and from REFERENCE COPY check operation 224, processing transitions to RETURN TO CALLER operation 230 earlier described.

As earlier described, interception of calls to open token function(s) allows malicious privilege change detection application 106 to determine whether a call to the open token function is associated with a critical token, and when it is, to make a reference copy of the initial privilege list associated with the critical token. The reference copy is then available for use in determining whether subsequently received calls to change the privileges of the critical token, if any, are indicative of malicious code as further described herein.

Referring again to FIG. 2A and CALL TYPE check operation 210, alternatively, when the call is a call to a set token function, processing transitions from CALL TYPE check operation 210, at operation 214, to a STALL CALL TO SET TOKEN FUNCTION operation 234 (FIG. 2C).

Referring now to FIG. 2C, in STALL CALL TO SET TOKEN FUNCTION operation 234, a call to a set token function is stalled. In one embodiment, a call to the ZwSetValue( ) function is stalled. In one embodiment the call to the set token function includes parameters that identify an access token to be modified. In particular, the call to the set token function includes a token handle that identifies an access token in which the privileges are to be modified. From STALL CALL TO SET TOKEN FUNCTION operation 234, processing transitions to a REFERENCE COPY check operation 236.

In REFERENCE COPY check operation 236, a determination is made whether the call to the set token function identifies an access token having a saved reference copy. In particular, a determination is made whether a token handle identified in the call to the set token function corresponds to, e.g., matches, a reference copy identifier that identifies a reference copy in the reference copy database.

When the token handle identified in the call to the set token function does not correspond to a reference copy identifier identifying a reference copy in the reference copy database ("NO"), a determination is made that a reference copy of the associated access token has not been saved in the reference copy database. As there is no reference copy to compare with the current privilege set identified in the call to the set token function, the call is allowed to complete, and from REFERENCE COPY check operation 236, processing transitions to a RELEASE CALL operation 242.

In RELEASE CALL operation 242, the call is released or otherwise allowed to proceed to the set token function. From RELEASE CALL operation 242, processing transitions to an EXIT operation 248, with processing exiting method 200, or optionally returning to operation 234 on receipt of a next call to a set token function.

Referring again to REFERENCE COPY check operation 236, alternatively, when the token handle identified in the call to the set token function corresponds to a reference copy identifier identifying a reference copy in the reference copy database ("YES"), a determination is made that a reference copy of the associated access token has been generated and saved in the reference copy database. The current privilege set identified in the call to the set token function can be evaluated for malicious changes, such as those that remove the debug privilege from a computer security application. From REFERENCE COPY check operation 236, processing transitions to a COMPARE CURRENT PRIVILEGE LIST TO INITIAL PRIVILEGE LIST operation 238.

In COMPARE CURRENT PRIVILEGE LIST TO INITIAL PRIVILEGE LIST operation 238, the current privilege list identified in the call to the set token function is compared to the initial privilege list of the reference copy to determine any changes. In particular, in one embodiment, each privilege setting identified in the current privilege list is compared to a corresponding privilege setting identified in the initial privilege list to determine if there are any changes, e.g., different settings. From COMPARE CURRENT PRIVILEGE LIST TO INITIAL PRIVILEGE LIST operation 238, processing transitions to a MALICIOUS CHANGE(S) check operation 240.

In MALICIOUS CHANGE(S) check operation 240, any changes in the current privilege list from the initial privilege list are evaluated to determine whether the changes are malicious changes, i.e., are indicative of a change by malicious code. In one embodiment, the changes are evaluated in accordance with a set of one or more rules that define when a change is a malicious change, e.g., when a malicious change is indicated. In one embodiment, the rules are a default set of rules. In one embodiment, the rules are customizable by a user. In one embodiment, the rules are included in or accessible by malicious privilege change detection application 106.

For example, in one embodiment, a rule includes that a malicious change is indicated when the debug privilege is removed from an Administrator, a Local System, or a computer security application token. In one embodiment, a malicious change rule database, algorithm or program that identifies when a privilege change is a malicious change is included in or accessible by malicious privilege change detection application 106.

When a malicious change is not indicated ("NO"), the call to the set token function is presumed not to include malicious changes, e.g., is not indicative of malicious code, and from MALICIOUS CHANGE(S) check operation 240, processing transitions to RELEASE CALL operation 242 earlier described.

Referring again to MALICIOUS CHANGE(S) check operation 240, alternatively, when a malicious change is indicated ("YES"), the call to the set token function is presumed to include malicious changes, e.g., is indicative of malicious code, and from MALICIOUS CHANGE(S) check operation 240, processing transitions to a TAKE PROTECTIVE ACTION operation 244.

In TAKE PROTECTIVE ACTION operation 244, protective action is taken to prevent the call to the set token function from completing or from otherwise changing the privilege(s) of the access token identified in the call to the set token function on host computer system 102. For example, in one embodiment, the call to the set token function is failed, e.g., terminated, and a call failure is returned to the calling code.

Failing the call to the set token function prevents the privileges in the access token from being changed. By preventing the privilege change, the access token retains its privileges. Thus, in some embodiments, malicious code is prevented from disabling needed privileges, such as the debug privilege, in selected user and program tokens, i.e., critical tokens.

In some embodiments, the privilege list of the access token is restored to the initial privilege list state. In this way, cumulative changes to the privilege list of an access token that in combination result in a malicious change are undone.

In some embodiments, the call to the set token function is modified to reflect the initial privilege list. Thus, in this embodiment, after modifying the call to the set token function to identify the initial privilege list rather than the current privilege list, for example, by overwriting the current privilege list with a copy of the initial privilege list, the call is released (not shown), thus restoring the access token to the initial privilege list state.

In some embodiments, the call to the set token function is automatically copied to a text file and sent to a security evaluation center. This allows malicious code to be directly collected in the field and sent for evaluation.

In one embodiment, the user is prompted for input prior to taking protective action, e.g., the user is asked for permission to take protective action. From TAKE PROTECTIVE ACTION operation 244, processing optionally transitions to a NOTIFY operation 246.

In optional NOTIFY operation 246, the user of host computer system 102 in FIG. 1, and/or a system administrator, are notified that protective action has been taken on host computer system 102, e.g., that a call has been terminated. The user can also be notified that a malicious change to a privilege level was attempted.

The user and/or administrator can be notified using any one of a number of techniques, e.g., by using a pop up window, by generating an e-mail, by writing to a file and/or otherwise by logging the event. Further, a notification can be provided to a security center. From optional NOTIFY operation 246, processing transitions to EXIT operation 248, earlier described, or optionally returns to operation 234 on receipt of a next call to a set token function.

In some embodiments, when a user logs off, a thread dies, a process unloads, or a process and/or thread is discarded by the operating system, malicious privilege change detection application 106 deletes the associated entries from the reference copy database.

The above embodiments of the invention prevent malicious changes to privileges of critical access tokens. Thus, malicious code, such as spyware and adware, are prevented from manipulating the privileges of users, processes, and threads, and in particular from removing the debug privilege from Administrator, and Local System users, and from computer security related programs, such as anti-spyware and anti-adware programs.

Although malicious privilege change detection application 106 is referred to as an application, this is illustrative only. Malicious privilege change detection application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, malicious privilege change detection application 106 is implemented as a system level, e.g., kernel mode, driver.

While embodiments in accordance with the present invention have been described for a client-server configuration, an embodiment of the present invention may be carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, malicious privilege change detection application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the functionality of malicious privilege change detection application 106 in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionality of malicious privilege change detection application 106 in accordance with one embodiment of present invention can be implemented in a wide variety of computer system configurations. In addition, the functionality of malicious privilege change detection application 106 could be stored as different modules in memories of different devices.

For example, malicious privilege change detection application 106 could initially be stored in server system 130, and then as necessary, a portion of malicious privilege change detection application 106 could be transferred to host computer system 102 and executed on host computer system 102. Consequently, part of the functionality of malicious privilege change detection application 106 would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, malicious privilege change detection application 106 is stored in memory 136 of server system 130. Malicious privilege change detection application 106 is transferred over network 126 to memory 112 in host computer system 102. In this embodiment, network interface 138 and I/O interface 110 would include analog modems, digital modems, or a network interface card. If modems are used, network 126 includes a communications network, and malicious privilege change detection application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer implemented method comprising:
    executing, on a processor, a malicious privilege change detection application, wherein said executing includes:
        stalling a call to a set token function, said call to said set token function including a token handle to an associated access token and a current privilege list;
        determining whether said token handle identifies a reference copy associated with said access token, said reference copy including an initial privilege list associated with said access token;
        comparing said current privilege list with said initial privilege list, upon a determination that said token handle identifies said reference copy associated with said access token;
        determining whether said current privilege list includes malicious changes based upon said comparing; and
        performing one of taking protective action and releasing said call to said set token function based on said determining whether said current privilege list includes malicious changes.

2. The computer implemented method of claim 1, wherein said performing performs said taking protective action, upon a determination that said current privilege list includes malicious changes.

3. The computer implemented method of claim 2 further comprising:
providing a notification to a user.

4. The computer implemented method of claim 1, wherein said computer implemented method is implemented as a kernel mode driver on a computer system.

5. The computer implemented method of claim 1, wherein said determining whether said token handle identifies a reference copy associated with said access token comprises:
determining whether said token handle corresponds to a reference copy identifier associated with a reference copy in a reference copy database;
upon a determination that said token handle corresponds to a reference copy identifier in said reference copy database, a determination is made that said token handle identifies a reference copy associated with said access token; and
upon a determination that said token handle does not correspond to a reference copy identifier in said reference copy database, a determination is made that said token handle does not identify a reference copy associated with said access token.

6. The computer implemented method of claim 1 further comprising:
upon a determination that said token handle does not identify a reference copy associated with said access token, releasing said call to said set token function.

7. The computer implemented method of claim 1, wherein said performing performs said releasing said call to said set token function upon a determination that said current privilege list does not include malicious changes.

8. The computer implemented method of claim 1 further comprising:
stalling a call to an open token function, said call to said open token function identifying an access token, said access token including said initial privilege list;
determining whether said access token is a critical token;
upon a determination that said access token is a critical token, determining whether a reference copy of said initial privilege list is saved, said reference copy including a copy of said initial privilege list;
upon a determination that said reference copy is not saved, obtaining said initial privilege list of said access token;
generating a reference copy of said initial privilege list, wherein said reference copy is identified by an reference copy identifier; and
completing said call to said open token function.

9. The computer implemented method of claim 8 further comprising:
upon a determination that said access token is not a critical token, completing said call to said open token function.

10. The computer implemented method of claim 8 further comprising:
upon a determination that said reference copy is saved, completing said call to said open token function.

11. The computer implemented method of claim 8 wherein said determining whether said access token is a critical token comprises:
calling said open token function;
receiving a token handle in response to said calling said open token function, said token handle including one or more parameters identifying one or more characteristics of said access token;
comparing said one or more characteristics to a critical token characteristics list including one or more entries of critical token characteristics;
wherein when one or more of said one or more characteristics corresponds to one or more of said one or more critical token characteristics, determining said access token is a critical token; and
wherein when one or more of said one or more characteristics does not correspond to one or more of said one or more critical token characteristics, determining said access token is not a critical token.

12. A computer implemented method comprising:
executing, on a processor, a malicious privilege change detection application, wherein said executing includes:
hooking one or more open token functions on a computer system;
hooking one or more set token functions on said computer system;
receiving a call to an open token function from a caller, said call to said open token function identifying an access token in a registry;
stalling said call to said open token function;
calling said open token function;
receiving a token handle in response to said calling said open token function, said token handle including one or more parameters identifying one or more characteristics of said access token;
determining whether said access token is a critical token based on said one or more characteristics;
determining whether a reference copy associated with said access token is saved upon a determination that said access token is a critical token, said reference copy including a copy of an initial privilege list associated with said access token;
obtaining an initial privilege list associated with said access token, upon a determination that said reference copy is not saved;
generating a reference copy of said initial privilege list, wherein said reference copy is saved in a reference copy database and identified in said reference copy database by a reference copy identifier; and
returning said token handle to said caller.

13. The computer implemented method of claim 12, wherein said reference copy identifier is said token handle received in response to said calling said open token function.

14. The computer implemented method of claim 12 further comprising:
receiving a call to a set token function, said call to said set token function identifying a token handle and a current privilege list, said token handle identifying an access token in said registry;
stalling said call to said set token function;
determining whether said token handle corresponds to a reference copy identifier, said reference copy identifier identifying a reference copy including an initial privilege list associated with an access token;
comparing said current privilege list with said initial privilege list upon a determination that said token handle corresponds to said reference identifier;
determining whether said current privilege list includes malicious changes based upon said comparing; and
taking protective action upon a determination that said current privilege list includes malicious changes.

15. A computer-program product comprising a computer readable medium containing computer program code comprising:

means for stalling a call to a set token function, said call to said set token function identifying a token handle and a current privilege list, said token handle identifying an associated access token;

means for determining whether said token handle identifies a reference copy associated with said access token, said reference copy including an initial privilege list associated with said access token;

means for comparing said current privilege list with said initial privilege list, upon a determination that said token handle identifies said reference copy associated with said access token;

means for determining whether said current privilege list includes malicious changes based upon a comparison of said current privilege list with said initial privilege list by said means for comparing; and means for taking protective action when said current privilege list includes malicious changes.

16. The computer program product of claim 15 further comprising:

means for stalling a call to an open token function, said call to said open token function identifying an access token, said access token including an initial privilege list;

means for determining whether said access token is a critical token;

means for determining whether a reference copy associated with said access token has been saved;

means for generating a reference copy of associated with said access token, said reference copy including at least a copy of said initial privilege list; and means for completing said call to said open token function.

17. The computer program product of claim 16 further comprising:

means for calling said open token function;

means for receiving a token handle returned in response to said calling said open token function;

means for identifying said reference copy associated with said access token by said token handle; and means for returning said token handle to said caller.

18. The computer program product of claim 15 further comprising:

means for hooking one or more open token functions on a computer system; and means for hooking one or more set token functions on said computer system.

19. A computer system comprising:

a memory having stored therein a malicious privilege change detection application; and a processor coupled to said memory, wherein execution of said malicious privilege change detection application generates a method comprising:

stalling a call to a set token function, said call to said set token function including a token handle to an associated access token and a current privilege list;

determining whether said token handle identifies a reference copy associated with said access token, said reference copy including an initial privilege list associated with said access token;

comparing said current privilege list with said initial privilege list, upon a determination that said token handle identifies said reference copy associated with said access token;

determining whether said current privilege list includes malicious changes based upon said comparing; and performing one of taking protective action and releasing said call to said set token function based on said determining whether said current privilege list includes malicious changes.

20. The computer system of claim 19, wherein said malicious privilege change detection application is a kernel mode driver.

* * * * *